United States Patent
Lv et al.

(10) Patent No.: US 9,723,597 B2
(45) Date of Patent: Aug. 1, 2017

(54) METHOD, DEVICE AND SYSTEM FOR TRANSMITTING CONTROL INFORMATION

(71) Applicant: Huawei Technologies Co., Ltd., Shenzhen (CN)

(72) Inventors: Yongxia Lv, Shenzhen (CN); Yan Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 13/974,798

(22) Filed: Aug. 23, 2013

(65) Prior Publication Data

US 2013/0343312 A1     Dec. 26, 2013

Related U.S. Application Data

(63) Continuation of application No. PCT/CN2012/071241, filed on Feb. 17, 2012.

(30) Foreign Application Priority Data

Feb. 23, 2011 (CN) .......................... 2011 1 0044037

(51) Int. Cl.
*H04W 72/04* (2009.01)
*H04L 1/16* (2006.01)
(Continued)

(52) U.S. Cl.
CPC ....... *H04W 72/0413* (2013.01); *H04L 1/1607* (2013.01); *H04L 1/1854* (2013.01); *H04L 5/0055* (2013.01); *H04L 2001/125* (2013.01)

(58) Field of Classification Search
CPC ... H04L 1/1607; H04L 1/1854; H04L 5/0053; H04L 5/0055; H04L 2001/125;
(Continued)

(56) References Cited

U.S. PATENT DOCUMENTS

| 2009/0323617 A1* | 12/2009 | Che | H04L 1/1635 370/329 |
| 2011/0194443 A1* | 8/2011 | Li | H04L 1/1621 370/252 |
| 2011/0211503 A1* | 9/2011 | Che | H04L 5/0005 370/280 |

FOREIGN PATENT DOCUMENTS

| CN | 101499882 A * | 8/2009 | ........... H04L 1/1614 |
| CN | 101583193 A | 11/2009 | |

(Continued)

OTHER PUBLICATIONS

Motorola, "Remaining Details on ACK/NACK Bundling for TDD", R1-082473, 3GPP TSG RAN1#53-Bis, Warsaw, Poland, Jun. 19-Jul. 4, 2008.*

(Continued)

*Primary Examiner* — Khoa Huynh
(74) *Attorney, Agent, or Firm* — Brinks, Gilson & Lione (57) ABSTRACT

Disclosed are a method, a device and a system for transmitting control information, which relate to the field of communication technologies. In order to feed back response information in an application scenario of dynamic TDD subframe, the present invention provides the following technical solution: determining a subframe set corresponding to uplink subframe n, the subframe set comprising dynamic subframes; determining feedback response information according to the subframe set; and sending, in uplink subframe n, the feedback response information to a base station through a physical uplink channel, wherein n is a subframe serial number of the uplink subframe.

13 Claims, 6 Drawing Sheets

(51) Int. Cl.
*H04L 1/18* (2006.01)
*H04L 5/00* (2006.01)
*H04L 1/12* (2006.01)

(58) Field of Classification Search
CPC ............. H04W 72/04; H04W 72/0406; H04W 72/0413; H04W 72/042; H04W 72/12; H04W 72/1263; H04W 72/1268; H04W 72/1273; H04W 72/1278; H04W 72/1284; H04W 72/1289
See application file for complete search history.

(56) References Cited

FOREIGN PATENT DOCUMENTS

| WO | WO 2009/120701 A2 | 10/2009 |
| WO | WO 2010/049587 A1 | 5/2010 |
| WO | WO 2012/106840 A1 | 8/2012 |

OTHER PUBLICATIONS

Motorola, "Remaining Details on ACK/NACK Bundling for TDD", R1-082473, 3GPP TSG RAN1#53-Bis, Warsaw, Poland, Jun. 29-Jul. 4, 2008.*
Motorola, "Remaining Details on ACK/NACK Bundling for TDD" Agenda Item 6.1, 3GPP TSG RAN1#53-Bis. Warsaw, Poland, Jun. 29-Jul. 4, 2008, 3 pages.

* cited by examiner

Prior Art

| HARQ-ACK(0), HARQ-ACK(1), HARQ-ACK(2), HARQ-ACK(3) | $n_{PUCCH}^{(1)}$ | $b(0), b(1)$ |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

METHOD, DEVICE AND SYSTEM FOR TRANSMITTING CONTROL INFORMATION

CROSS-REFERENCE TO RELATED APPLICATION

This application is a continuation of International Application No. PCT/CN2012/071241, filed on Feb. 17, 2012, which claims priority to Chinese Patent Application No. 201110044037.0, filed on Feb. 23, 2011, both of which are hereby incorporated by reference in their entireties.

TECHNICAL FIELD

This invention relates to the technical field of communications, and particularly, to a method, a device and a system for transmitting control information.

BACKGROUND

The Hybrid Automatic Repeat Request (HARQ) is a technology which makes a retransmission decision using the link level information. In the HARQ technology, the data receiver shall feed back to the data transmitter response information, which is one type of control information, so as to determine whether the data is correctly received. In the $3^{rd}$ Generation Partnership Project Long Term Evolution (3GPP LTE) system, the response information is mainly fed back to the base station through a Physical Uplink Control Channel (PUCCH) or a Physical Uplink Share Channel (PUSCH).

The 3GPP LTE system includes a Frequency Division Duplexing (FDD) system and a Time Division Duplexing (TDD) system. In which, the TDD system sends and receives the data in the same frequency channel but in different time, i.e., the data is sent and received using different time slots of the same frequency carrier. In addition, the TDD system supports different uplink-downlink configurations, and it can semi-statically adjust the uplink-downlink configuration according to different types of services, so as to meet the unsymmetrical uplink-downlink service requirements. Moreover, in correspondence with different uplink-downlink configurations, different timing relationships are set for feeding back the response information corresponding to the downlink transmission. Under various uplink-downlink configurations, the response information corresponding to the downlink transmission of one or more downlink subframes are fed back in corresponding uplink subframes, according to the timing relationships set for feeding back the response information corresponding to the downlink transmission.

Figure 1:
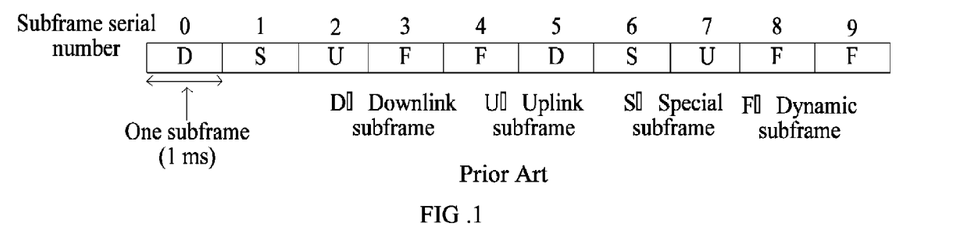
FIG. 1 is a schematic diagram of an application of a dynamic TDD subframe.

In a system earlier than version LTE R11, the uplink-downlink configuration to be used is semi-statically set, and the set uplink-downlink configuration may be unmatched with the instantaneous service type, thus the resources cannot be effectively utilized. In order that the practically used uplink-downlink configuration is better matched with the instantaneous service type, and the communication resources are utilized more effectively, the dynamic TDD subframe application technology can be introduced into version LTE R11, i.e., the radio frame may be provided with some dynamic subframes serving as either the uplink subframes or the downlink subframes. FIG. 1 is a schematic diagram of an application of a dynamic TDD subframe in a radio frame, which illustrates that the last two subframes in every half radio frame are dynamic subframes.

During the implementation of the present invention, the inventor finds that in an application scenario of the dynamic TDD subframe, the dynamic subframe can be used in either the uplink transmission or downlink transmission, depending on the instantaneous service type, so the formed uplink-downlink configuration is variable. In addition, a signaling indicating whether the dynamic subframe is an uplink subframe or a downlink subframe may be lost or falsely detected by the User Equipment (UE). As a result, the base station and the UE may have inconsistent understandings of the formed uplink-downlink configuration. Thus, if the response information is fed back in real time according to the timing relationship corresponding to the formed uplink-downlink configuration, an erroneous transmission of the response information will occur, and the security of data transmission in the application scenario of the dynamic TDD subframe cannot be ensured. In addition, in the application scenario of the dynamic TDD subframe, sometimes the formed configuration even may not belong to any configuration in the existing LTE TDD system, thus there is no corresponding timing relationship for feeding back the response information. Therefore, how to feed back the response information in the application scenario of the dynamic TDD subframe is a problem emergently to be solved at present.

SUMMARY

The embodiments of the present invention provide a method, a device and a system for transmitting control information, which can feed the back response information in the application scenario of the dynamic TDD subframe.

In order to achieve the above object, the embodiments of the present invention adopt the following technical solutions:

A method for transmitting control information, comprising:
  determining a subframe set corresponding to an uplink subframe n, the subframe set comprising dynamic subframes;
  determining feedback response information according to the subframe set; and
  sending, in the uplink subframe n, the feedback response information to a base station through a physical uplink channel, wherein n is a subframe serial number of the uplink subframe and n is a natural number larger than or equal to 0.

A User Equipment (UE), comprising:
  a set determining unit configured to determine a subframe set corresponding to an uplink subframe n, the subframe set comprising dynamic subframes;
  an information acquiring unit configured to determine feedback response information according to the subframe set determined by the set determining unit; and
  an information sending unit configured to send, in the uplink subframe n, the feedback response information to a base station through a physical uplink channel, wherein n is a subframe serial number of the uplink subframe, and n is a natural number larger than or equal to 0.

A method for transmitting control information, comprising:
  determining a subframe set corresponding to an uplink subframe n, the subframe set comprising dynamic subframes, wherein n is a subframe serial number of the uplink subframe and n is a natural number larger than or equal to 0; and receiving response information fed back by a UE in a physical uplink channel, and detecting response information corresponding to subframes in the subframe set.

A base station, comprising:

a set determining unit configured to determine a subframe set corresponding to an uplink subframe n, the subframe set comprising dynamic subframes, wherein n is a subframe serial number of the uplink subframe, and n is a natural number larger than or equal to 0;

an information receiving unit configured to receive response information fed back by a UE in a physical uplink channel; and an information detecting unit configured to detect response information corresponding to subframes in the subframe set determined by the set determining unit.

A system for transmitting control information, comprising:

a UE configured to determine a subframe set corresponding to an uplink subframe n, determine feedback response information according to the subframe set, and send, in the uplink subframe n, the feedback response information to a base station through a physical uplink channel; and the base station configured to determine a subframe set corresponding to an uplink subframe n, receive response information fed back by a UE in a physical uplink channel, and detect response information corresponding to subframes in the subframe set;

wherein the subframe set comprises dynamic subframes, n is a subframe serial number of the uplink subframe, and n is a natural number larger than or equal to 0.

In the method, device and system for transmitting control information provided by the embodiments of the present invention, a subframe set corresponding to an uplink subframe n is determined through a UE, wherein the subframe set comprises dynamic subframes; feedback response information is determined according to the subframe set, and sent in uplink subframe n to the base station through a physical uplink channel, so as to map response information corresponding to the dynamic subframes to the uplink subframe n for a transmission; as a result, the timing relationship for feeding back the response information does not vary with the dynamic subframes, thereby avoiding an erroneous response information transmission caused when a signaling indicating whether the dynamic subframes are uplink subframes or a downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

BRIEF DESCRIPTION OF DRAWINGS

In order to more clearly describe the technical solutions of the embodiments of the present invention, the drawings to be used in the descriptions of the embodiments are briefly introduced as follows. Obviously, the following drawings just illustrate some embodiments of the present invention, and a person skilled in the art can obtain other drawings from these drawings without paying any creative effort.

DESCRIPTION OF EMBODIMENTS

The technical solutions of the embodiments of the present invention will be clearly and completely described as follows with reference to the drawings in the embodiments of the present invention. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

Figure 2:
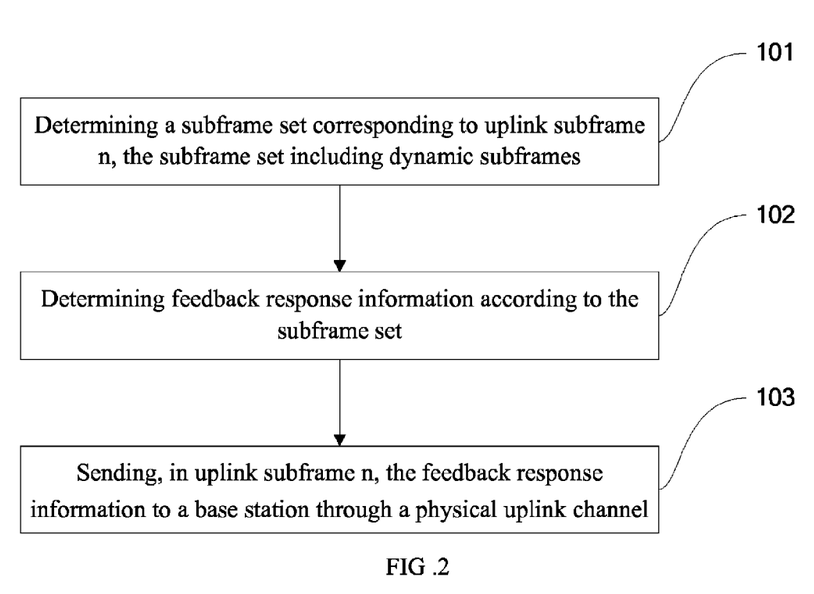
FIG. 2 is a flow diagram of a method for transmitting control information provided by an embodiment of the present invention.

In order to feed back the response information in the application scenario of the dynamic TDD subframe, the embodiments of the present invention provide a method for transmitting control information, as illustrated in FIG. 2, including:

101: a UE determines a subframe set corresponding to an uplink subframe n, the subframe set including dynamic subframes.

For the uplink subframe n in any embodiment of the present invention, n is the subframe serial number in multiple radio frames, and n is a natural number larger than or equal to 0.

For example, a subframe set $K':\{n-k_0, n-k_1, \ldots, n-k_{M-1}\}$ corresponding to the uplink subframe n may be determined according to a timing relationship preset for feeding back the response information, in which $k_0, k_1, \ldots k_{M-1}$ are positive integers, and the subframe set includes dynamic subframes and fixed downlink subframes. Specifically, the subframe set $K':\{n-k_0, n-k_1, \ldots, n-k_{M-1}\}$ corresponding to the uplink subframe n may be determined according to a set $K:\{k_0, k_1, \ldots, k_{M-1}\}$, in which the subframe set $K':\{n-k_0, n-k_1, \ldots, n-k_{M-1}\}$ includes dynamic subframes and fixed downlink subframes, the set $K:\{k_0, k_1, \ldots, k_{M-1}\}$ is corresponding to the uplink subframe n, and $k_0, k_1, \ldots k_{M-1}$ are positive integers.

In any embodiment of the present invention, the dynamic subframe refers to a subframe that may be either an uplink subframe or a downlink subframe in the radio frame. When the dynamic subframe is an uplink subframe, it means that the dynamic subframe is used as an uplink subframe, and in that case, the dynamic subframe may be called as a dynamic uplink subframe. When the dynamic subframe is a downlink subframe, it means that the dynamic subframe is used as a downlink subframe, and in that case, the dynamic subframe may be called as a dynamic downlink subframe. In an application scenario of the dynamic TDD subframe, the base station will configure some of the subframes in each of N radio frames as dynamic subframes, and the other subframes as fixed subframes, in which N is a natural number larger than or equal to 1. The fixed subframes are fixed as either uplink subframes or downlink subframes. The dynamic subframes may be either uplink subframes or downlink subframes, and the details about whether the dynamic subframes are uplink subframes or downlink subframes are determined through other measures, e.g., the base station may dynamically indicate whether the dynamic subframes are uplink subframes or downlink subframes.

To be noted, in any embodiment of the present invention, the subframe set corresponding to uplink subframe n may include one or more dynamic subframes, which may be all uplink subframes or all downlink subframes, or partially uplink subframes and partially downlink subframes. In one embodiment of the present invention, when the dynamic subframes included in the subframe set corresponding to the uplink subframe n are uplink subframes, it means that one or more dynamic subframes included in the subframe set corresponding to the uplink subframe n are uplink subframes.

Figure 4:
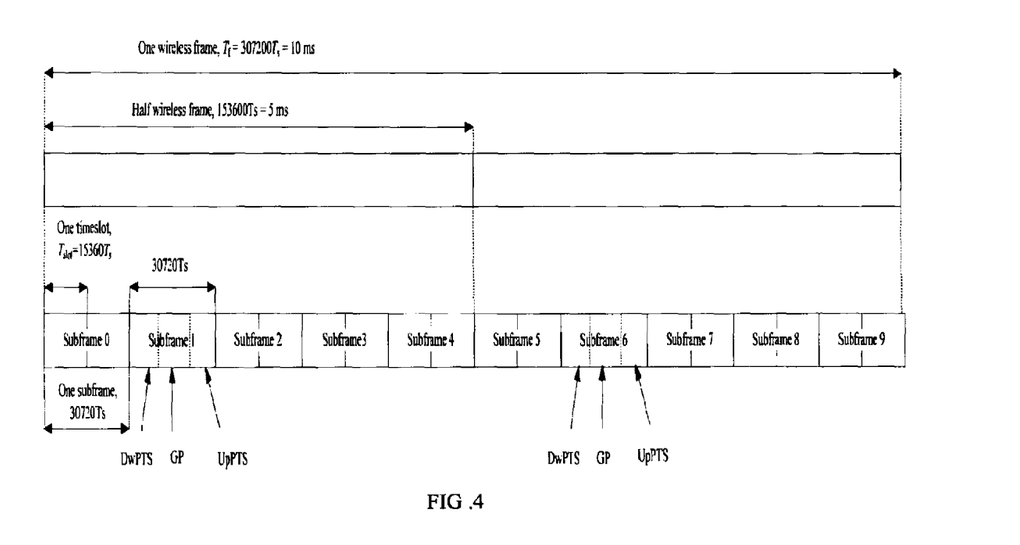
FIG. 4 is a frame structure diagram of a radio frame in an embodiment of the present invention.

Taking the frame structure of one radio frame illustrated in FIG. 4 as an example, the frame length of one radio frame is 10 ms, each radio frame includes 10 subframes, and each subframe is 1 ms. Generally, the 10 subframes in one radio frame are marked as subframes 0-9 according to the time order, and 0-9 are the subframe serial numbers in one radio frame. For example, the third subframe in a radio frame is a subframe having a subframe serial number 2 in the radio frame, and the eighth subframe in the radio frame is a subframe having a subframe serial number 7 in the radio frame.

In any embodiment of the present invention, the subframe serial number refers to the serial number of a subframe in multiple radio frames, and it may be obtained as follows: the subframes in multiple radio frames are numbered from 0 in a monotone increasing mode according to the time order, i.e., if the last subframe in the previous radio frame is numbered as n', the first subframe in the next radio frame is numbered as n'+1.

Among multiple radio frames, each subframe also has a subframe serial number in the radio frame where it is located, and such subframe serial number is a subframe serial number of the subframe in one radio frame. For example, regarding subframe 2 in one radio frame, 2 is the subframe serial number of the subframe in the radio frame.

In any embodiment of the present invention, the uplink subframe n may be the third or eighth subframe in each of N radio frames, in which N is an integer larger than or equal to 1.

102: the UE determines feedback response information according to the subframe set acquired in step 101.

For example, the UE may determine the feedback response information according to the subframe set acquired in step 101 as follows:

determining and sorting response information corresponding to respective subframes in the subframe set to acquire the feedback response information.

Specifically, if a dynamic subframe in the subframe set is an uplink subframe, corresponding response information is negative-acknowledge response information NACK; or if the dynamic subframe in the subframe set is an uplink subframe, corresponding response information is discontinuous transmission DTX.

The response information corresponding to respective subframes may be sorted according to a predetermined order, which may be a subframe sorting order in the subframe set, i.e., the response information corresponding to respective subframes may be sorted according to the subframe sorting order in the subframe set, so as to acquire the feedback response information.

103: the UE sends, in the uplink subframe n, the feedback response information acquired in step 102 to a base station through a physical uplink channel.

For example, the UE may send, in the uplink subframe n, the feedback response information acquired in step 102 to the base station through a physical uplink channel in at least two manners as follows:

Manner 1: sending, in the uplink subframe n, the feedback response information acquired in step 102 to the base station through a PUCCH.

Manner 2: sending, in the uplink subframe n, the feedback response information acquired in step 102 to the base station through a PUSCH, specifically including:

determining the number of bits of the feedback response information according to the set K:$\{n-k_0, n-k_1, \ldots, n-k_{M-1}\}$ in step 101; the number of bits of the feedback response information specifically may be M or 2M, in which M is the number of elements in the set K:$\{n-k_0, n-k_1, \ldots, n-k_{M-1}\}$;

determining the number of modulation symbols occupied by the feedback response information acquired in step 102 in the PUSCH according to the acquired number of bits of the feedback response information;

determining the number of bits of the feedback response information acquired in step 102 having been channel-coded according to the acquired number of modulation symbols;

performing a channel coding to the feedback response information according to the acquired number of bits of the feedback response information having been channel-coded, so as to acquire channel-coded response information; and sending, in the uplink subframe n, the acquired channel-coded response information to the base station through the PUSCH.

In the method for transmitting control information provided by the embodiment of the present invention, a subframe set corresponding to the uplink subframe n is determined through a UE, in which the subframe set includes dynamic subframes; feedback response information is determined according to the subframe set, and sent in the uplink subframe n to the base station through a physical uplink channel, so as to map response information corresponding to the dynamic subframes to the uplink subframe n for a transmission; as a result, the timing relationship for feeding back the response information does not vary with the dynamic subframes, thereby avoiding an erroneous response information transmission caused when a signaling indicating whether the dynamic subframes are uplink subframes or a downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

Figure 3:
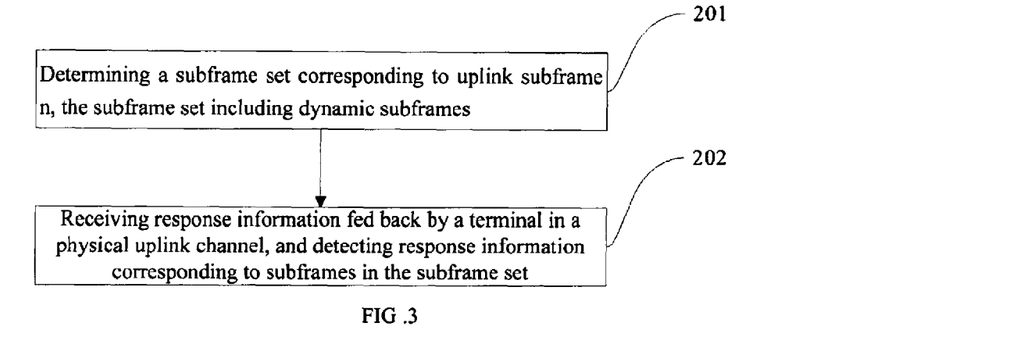
FIG. 3 is a flow diagram of another method for transmitting control information provided by an embodiment of the present invention.

In correspondence to the above embodiment, the embodiments of the present invention further provide a method for transmitting control information, as illustrated in FIG. 3, including:

201: a base station determines a subframe set corresponding to an uplink subframe n, the subframe set including dynamic subframes, in which n is the subframe serial number of the uplink subframe, and n is a natural number larger than or equal to 0.

For example, the base station may determine the subframe set corresponding to uplink subframe n according to a timing relationship preset for feeding back the response information, in which the subframe set includes dynamic subframes and fixed downlink subframes. Specifically, a subframe set $K':\{n-k_0, n-k_1, \ldots, n-k_{M-1}\}$ corresponding to the uplink subframe n may be determined according to a set $K:\{k_0, k_1, \ldots, k_{M-1}\}$, in which the subframe set $K':\{n-k_0, n-k_1, \ldots, n-k_{M-1}\}$ includes dynamic subframes and fixed downlink subframes, the dynamic subframes may be uplink subframes, and the set $K:\{k_0, k_1, \ldots, k_{M-1}\}$ is corresponding to the uplink subframe n.

For other descriptions of this step, please refer to step 101, which herein are omitted.

202: the base station receives response information fed back by a terminal in a physical uplink channel, and detects response information corresponding to subframes in the subframe set acquired in step 201.

For example, the base station may detect the response information corresponding to the subframes in the subframe set acquired in step 201 in at least two manners as follows:

Manner 1: detecting, in uplink subframe n and in response information resources reserved by the base station, the response information corresponding to the subframes in the subframe set acquired in step 201.

In which, the response information resources reserved by the base station may be a PUCCH for response information transmission reserved by the subframe set and acquired by the base station according to step 201. Since the subframe set in step 201 may be determined according to the set $K:\{k_0, k_1, \ldots, k_{M-1}\}$, it may be deemed that the response information resources reserved by the base station is a PUCCH for response information transmission reserved by the base station according to the set $K:\{k_0, k_1, \ldots, k_{M-1}\}$.

This manner is corresponding manner 1 in step 103.

Manner 2: detecting, in the uplink subframe n and in a PUSCH, the response information corresponding to the subframes in the subframe set acquired in step 201, specifically including:

determining, in uplink subframe n, the number of bits of response information fed back by the UE according to the subframe set acquired in step 201; since the subframe set in step 201 may be determined according to the set $K:\{k_0, k_1, \ldots, k_{M-1}\}$, it may be deemed as determining, in uplink subframe n, the number of bits of the response information fed back by the UE according to the set $K:\{k_0, k_1, \ldots, k_{M-1}\}$; the number of bits of the feedback response information specifically may be M or 2M, in which M is the number of elements in the set $K:\{k_0, k_1, \ldots, k_{M-1}\}$;

determining the number of modulation symbols occupied by the response information fed back by the UE in the PUSCH according to the acquired number of bits of the response information fed back by the UE; and detecting the response information fed back by the UE and transmitted in the PUSCH according to the acquired number of modulation symbols, so as to acquire the response information corresponding to the subframe in the subframe set.

In the method for transmitting control information provided by the embodiment of the present invention, a subframe set corresponding to the uplink subframe n is determined through a base station, in which the subframe set includes dynamic subframes; response information fed back by a terminal in a physical uplink channel is received, and response information corresponding to subframes in the subframe set is detected, so as to map response information corresponding to the dynamic subframes to the uplink subframe n for a detection; as a result, the timing relationship for detecting the response information does not vary with the dynamic subframe, thereby avoiding an erroneous response information transmission caused when a signaling indicating whether the dynamic subframes are uplink subframes or downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

In the application scenario of the dynamic TDD subframe as illustrated in FIG. 1, subframes 0, 1, 5 and 6 in one radio frame are fixed as downlink subframes, and the four subframes may also be called as fixed downlink subframes; subframes 2 and 7 in one radio frame are fixed as uplink subframes, and the two subframes may also be called as fixed uplink subframes; and subframes 3, 4, 8 and 9 in one radio frame are dynamic subframes. Next, the aforementioned embodiment will be further described in details by taking the application scenario of the dynamic TDD frame as illustrated in FIG. 1 (i.e., the application of the dynamic subframes in each of N radio frames as illustrated in FIG. 1) as an example, and in conjunction with the two situations where the response information are fed back on the PUSCH and the PUCCH, respectively.

The embodiments of the present invention provide a method for transmitting control information in a PUSCH, including:

301: a UE determines a subframe set corresponding to the uplink subframe n, the subframe set including dynamic subframes.

The UE may determine a subframe set $K':\{n-k_0, n-k_1, \ldots, n-k_{M-1}\}$ corresponding to the uplink subframe n according to a timing relationship preset for feeding back the response information, in which $k_0, k_1, \ldots, k_{M-1}$ are positive integers, and the subframe set includes dynamic subframes and fixed downlink subframes. Specifically, the subframe set $K':\{n-k_0, n-k_1, \ldots, n-k_{M-1}\}$ corresponding to the uplink subframe n may be determined according to a set $K:\{k_0, k_1, \ldots, k_{M-1}\}$, in which $n-k_i$, $i=0,1, \ldots, M-1$ are subframe serial numbers in multiple radio frames, the subframe set $K':\{n-k_0, n-k_1, \ldots, n-k_{M-1}\}$ includes dynamic subframes which may be uplink subframes, and the set $K:\{k_0, k_1, \ldots, k_{M-1}\}$ is corresponding to the uplink subframe n. The subframe set corresponding to the uplink subframe n may also be determined according to the timing relationship, which is preset for feeding back the response information corresponding to the downlink transmission and which is corresponding to uplink-downlink configuration 2 in a TDD system of version LTE R8, and the subframe set includes dynamic subframes.

For example, the set $K:\{k_0, k_1, \ldots, k_{M-1}\}$ in the embodiment may be $\{7, 6, 8, 4\}$ or $\{7, 6, 4, 8\}$, then the subframe set corresponding to the uplink subframe n in this step may be $\{n-7, n-6, n-8, n-4\}$ or $\{n-7, n-6, n-4, n-8\}$ in which subframes n-4 and n-8 are dynamic subframes.

In the embodiment, the uplink subframe n may be the third or eighth subframe in each of N radio frames, i.e., subframe 2 or 7 in each of N radio frames, i.e., uplink subframe 2 or 7 in each of N radio frames, or called as fixed uplink subframe 2 or 7 in each of N radio frames, in which uplink subframes 2 and 7 may correspond to the same or different sets $K:\{k_0, k_1, \ldots, k_{M-1}\}$.

Figure 5:
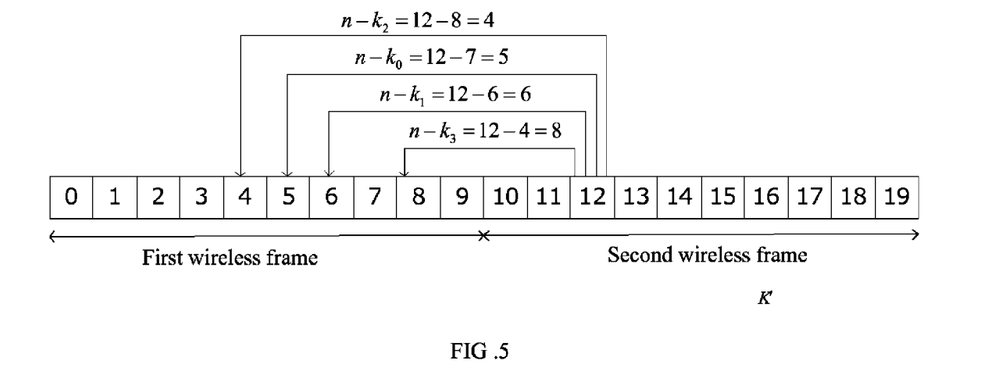
FIG. 5 is a schematic diagram of correspondence relationships between an uplink subframe for feeding back response information and a subframe in corresponding subframe set.

FIG. 5 is a schematic diagram of correspondence relationships between an uplink subframe for feeding back response information and subframes in corresponding subframe set. For example, in the embodiment, the uplink subframe n is subframe 2 or 7 in each of N radio frames, and when the set $K:\{k_0, k_1, \ldots, k_{M-1}\}$ is $\{7, 6, 8, 4\}$, FIG. 5 gives a schematic diagram of correspondence relationships between uplink subframe 2 in a second radio frame and subframes in corresponding subframe set. As illustrated in FIG. 5, in that case, a subframe set $K':\{n-k_0, n-k_1, \ldots, n-k_{M-1}\}$ corresponding to uplink subframe 2 (having a subframe serial number 12) in the second radio frame is $\{5, 6, 4, 8\}$, in which subframes 4 and 8 are dynamic subframes in a first radio frame.

In this step, even if the dynamic subframes are uplink subframes, they are still sorted into the subframe set corresponding to the uplink subframe n. Thus, even if the base station and the UE are inconsistent with each other in understanding whether the dynamic subframes are uplink subframes or downlink subframes, the data in the PUSCH and the response information corresponding to other subframes still can be ensured to be correctly received.

302: the UE determines feedback response information according to the subframe set acquired in step 301.

For example, the UE may determine the feedback response information according to the subframe set acquired in step 301 in at least two manners as follows:

Manner 1

Determining and sorting response information corresponding to respective subframes in the subframe set to acquire the feedback response information.

The manner may include the following two steps:

Step 302-1-a: determining the response information corresponding to respective subframes in the subframe set.

Specifically, if a dynamic subframe in the subframe set is an uplink subframe, the response information corresponding to the dynamic subframe is negative-acknowledge response information NACK; and if the dynamic subframe is a downlink subframe, the response information corresponding to the dynamic subframe is dependent on the detection condition of the subframe downlink information. If neither a PDSCH transmission nor a PDCCH indicating a downlink Semi-Persistent Scheduling (SPS) release is detected in the dynamic subframe, the response information corresponding to the dynamic subframe is negative-acknowledge response information NACK. If a PDSCH transmission is detected in the dynamic subframe, but at least one Transmission Block (TB) in data transmitted in the PDSCH is not correctly transmitted, the response information corresponding to the dynamic subframe is negative-acknowledge response information NACK. If a PDSCH transmission is detected in the dynamic subframe and data is correctly transmitted in the PDSCH, or a PDCCH indicating a downlink SPS release is detected in the dynamic subframe, the response information corresponding to the dynamic subframe is acknowledge response information ACK. For a downlink subframe in the subframe set, its corresponding response information is similar to the case where the dynamic subframe is a downlink subframe, and herein is omitted.

In this step, the response information corresponding to respective subframes in the subframe set is determined, or the bit of the response information corresponding to respective subframes in the subframe set may be determined directly, which is corresponding to the case of determining the response information corresponding to respective subframes in the subframe set as described in the above paragraph. If the response information corresponding to a subframe is ACK, the bit of the response information corresponding to the subframe is 1; and if the response information corresponding to a subframe is NACK, the bit of the response information corresponding to the subframe is 0.

In this step, if the response information is not spatially bundled and the transmission mode corresponding to the carrier allows receiving a Transmission Block (TB) of two codewords, each subframe is corresponding to response information of two bits. For example, if the response information corresponding to the subframe is negative-acknowledge response information, the content is NACK NACK, and the bits of the response information corresponding to the response information are 00; and if the response information corresponding to the subframe is acknowledge response information, the content is ACK ACK, and the bits of the response information corresponding to the response information are 11.

Step 302-1-b: sorting the response information corresponding to respective subframes to acquire the feedback response information.

In this step, the response information corresponding to respective subframes may be sorted according to a predetermined order, which may be a subframe sorting order in the subframe set, i.e., the response information corresponding to respective subframes may be sorted according to the subframe sorting order in the subframe set, so as to acquire the feedback response information. For example, response information corresponding to subframe $n-k_0$ in the subframe set $K':\{n-k_0, n-k_1, \ldots, n-k_{M-1}\}$ is firstly sorted, and then response information corresponding to subframe $n-k_1$ in the subframe set is secondly sorted, and so on, until response information corresponding to subframe $n-k_{M-1}$ in the subframe set is finally sorted. In brief, when the response information is spatially bundled, the bits of the response information corresponding to subframe $n-k_i$, $i=0, 1, \ldots M-1$ in the subframe set correspond to $o_i^{ACK}$, $i=0, 1, \ldots M-1$ in a bit sequence of the feedback response information.

The response information is usually coded by using the Reed Muller (RM) codes, and due to the characteristics of the RM codes, the bits in front of the response information have better performances. In this step, the response information corresponding to respective subframes are sorted according to the subframe sorting order in the subframe set, so that response information corresponding to the fixed downlink subframes is in front of the feedback response information, and response information corresponding to the dynamic subframes is behind the feedback response information. When the dynamic subframes are uplink subframes, the corresponding response information is less important than those corresponding to other subframes, thus the performances of the important response information are ensured.

Manner 2

If the PUSCH transmission bearing the response information has no corresponding uplink (UL) grant (i.e., a PDCCH signaling that carries a downlink control information format 0 or 4), the feedback response information is determined according to the method as described in manner 1.

If the PUSCH transmission bearing the response information has corresponding UL grant, the feedback response information is determined according to the value of a Downlink Assignment Index (DAI) in the UL grant. For example, in the scenario of non-carrier aggregation, this step specifically includes: determining the number of bits of the feedback response information $O^{ACK}=V_{DAI}^{UL}$, in which $V_{DAI}^{UL}$ is the value of the DAI in the UL grant and it represents a sum of the number of downlink subframes that bear a UE PDSCH and the number of downlink subframes that bear a PDCCH indicating a UE downlink SPS release in a subframe set $K':\{n-k_0, n-k_1, \ldots, n-k_{M-1}\}$ corresponding to a set $K:\{k_0, k_1, \ldots, k_{M-1}\}$; then acquiring bits $o_n^{ACK}$, $n=0, \ldots, O^{ACK}-1$ of the feedback response information as follows: $O_{DAI(k_i)-1}^{ACK}$ are the bits of response information corresponding to subframe $n-k_i$ in the subframe set $K':\{n-k_0, n-k_1, \ldots, n-k_{M-1}\}$ corresponding to the set K, and if a certain downlink subframe in the subframe set $K':\{n-k_0, n-k_1, \ldots, n-k_{M-1}\}$ transmits downlink SPS data, response information corresponding to the SPS data is $o_{O^{ACK}-1}^{ACK}$, in which $DAI(k_i)$ is the value of a DAI in a PDCCH Downlink Control Information (DCI) format received by subframe $n-k_i$, and it represents the accumulative numbers of the subframes where the base station schedules a PDSCH and sends a PDCCH indicating a UE downlink SPS release in the subframe set $K':\{n-k_0, n-k_1, \ldots, n-k_{M-1}\}$ corresponding to the set $K:\{k_0, k_1, \ldots, k_{M-1}\}$, while the PDCCH DCI format may be DCI format 1/1A/1B/1D/2/2A/2B/2C.

To be noted, in the scenario of carrier aggregation, after being acquired in manner 1 or 2, the bit sequences of the feedback response information corresponding to respective carriers shall be sorted in a predetermined rule, specifically in an ascending order of the carrier indexes, to finally acquire the bit sequences of the feedback response information in this step.

In this step, if a dynamic subframe in the subframe set is an uplink subframe, the response information corresponding to the dynamic subframe is set as negative-acknowledge response information NACK. According to the coding characteristics of the RM codes, the bits of the response information corresponding to the dynamic subframe may be prevented from influencing the transmission of the bits of other effective response information, which implicitly applies the corresponding resources to the transmission of the bits of the effective response information, thereby improving the performances of the bits of the effective response information, in which the bits of the effective response information refer to the bits of the response information corresponding to the subframes where the base station schedules a PDSCH or sends a PDCCH signaling indicating a downlink SPS release.

303: the UE sends, in uplink subframe n, the feedback response information acquired in step 302 to the base station through a PUSCH.

Step 303-a: determining the number of bits $O^{ACK}$ of the feedback response information according to the set $K:\{k_0, k_1, \ldots, k_{M-1}\}$ in step 301; specifically, the UE may implement the step in at least two manners as follows:

Manner 1: if the response information is spatially bundled, the number of bits $O^{ACK}$ of the feedback response information is M; and if the response information is not spatially bundled and the transmission mode corresponding to the carrier allows receiving a TB of two codewords, the number of bits $O^{ACK}$ of the feedback response information is 2M, in which M is the number of elements in the set $K:\{k_0, k_1, \ldots, k_{M-1}\}$. This manner corresponds to manner 1 in step 302.

Manner 2: if the PUSCH transmission bearing the response information has no corresponding UL grant, the number of bits of the feedback response information is determined in manner 1; and if the PUSCH transmission bearing the response information has corresponding UL grant, the number of bits of the feedback response information is $O^{ACK}=V_{DAI}^{UL}$. This manner corresponds to manner 2 in step 302.

Step 303-b: determining the number of modulation symbols occupied by the feedback response information acquired in step 302 in the PUSCH according to the acquired number of bits of the feedback response information;

Step 303-c: determining the number of bits of the feedback response information acquired in step 302 having been channel-coded according to the acquired number of modulation symbols;

Step 303-d: performing a channel coding of the feedback response information according to the acquired number of bits of the feedback response information having been channel-coded, so as to acquire channel-coded response information; and Step 303-e: sending, in uplink subframe n, the acquired channel-coded response information to the base station through the PUSCH.

In this step, even if the dynamic subframes are uplink subframes, the number of bits of the feedback response information is still calculated as M, so that the number of modulation symbols occupied by the response information in the PUSCH does not vary with the dynamic subframes. Thus, even if the base station and the UE are inconsistent with each other in understanding whether the dynamic subframes are uplink subframes or downlink subframes, the data in the PUSCH and the response information corresponding to other subframes still can be ensured to be correctly received.

304: the base station detects the response information sent from the user.

This step may include the following two steps:

Step 304-1: the base station determines a subframe set corresponding to uplink subframe n, the subframe set including dynamic subframes, in which n is the subframe serial number of the uplink subframe, and n is a natural number larger than or equal to 0.

The base station may determine the subframe set corresponding to uplink subframe n according to a timing relationship preset for feeding back the response information, in which the subframe set includes dynamic subframes and fixed downlink subframes. Specifically, a subframe set $K':\{n-k_0, n-k_1, \ldots, n-k_{M-1}\}$ corresponding to uplink subframe n may be determined according to a set $K:\{k_0, k_1, \ldots, k_{M-1}\}$, in which the subframe set $K':\{n-k_0, n-k_1, \ldots, n-k_{M-1}\}$ includes dynamic subframes and fixed downlink subframes, the dynamic subframes may be uplink subframes, and the set $K:\{k_0, k_1, \ldots, k_{M-1}\}$ is corresponding to uplink subframe n.

For the implementation of this step, please refer to related description of step 301 where the UE determines the subframe set corresponding to uplink subframe n, and herein is omitted.

Step 304-2: the base station receives response information fed back by a terminal in a physical uplink channel, and detects response information corresponding to subframes in the subframe set acquired in step 304-1 sent by the UE.

Step 304-2-a: determining, in uplink subframe n, the number of bits of the response information fed back by the UE according to the subframe set acquired in step 304-1; since the subframe set in step 304-1 may be determined according to the set K:$\{k_0, k_1, \ldots, k_{M-1}\}$ it may be deemed that the base station determines, in uplink subframe n, the number of bits of the response information fed back by the UE according to the set K:$\{k_0, k_1, \ldots, k_{M-1}\}$. Specifically, the step may be implemented in at least two manners as follows:

Manner 1: if the response information is spatially bundled, the number of bits $O^{ACK}$ of the feedback response information is M; and if the response information is not spatially bundled and the transmission mode corresponding to the carrier allows receiving a TB of two codewords, the number of bits $O^{ACK}$ of the feedback response information is 2M, in which M is the number of elements in the set K:$\{k_0, k_1, \ldots, k_{M-1}\}$. This manner corresponds to manner 1 in step 303-a.

Manner 2: if the PUSCH transmission bearing the response information has no corresponding UL grant, the number of bits of the feedback response information is determined in manner 1; and if the PUSCH transmission bearing the response information has corresponding UL grant, the number of bits of the feedback response information is $O^{ACK}=V_{DAI}^{UL}$. This manner corresponds to manner 2 in step 303-a.

Step 304-2-b: determining the number of modulation symbols occupied by the response information fed back by the UE in the PUSCH according to the acquired number of bits of the response information fed back by the UE;

Step 304-2-c: detecting the response information fed back by the UE and transmitted in the PUSCH according to the acquired number of modulation symbols, so as to acquire the response information corresponding to the subframes in the subframe set.

In the method for transmitting control information provided by the embodiment of the present invention, a subframe set corresponding to uplink subframe n is determined through a UE, in which the subframe set includes dynamic subframes; feedback response information is determined according to the subframe set, and sent in uplink subframe n to a base station through a physical uplink channel. The subframe set corresponding to uplink subframe n is determined through the base station, in which the subframe set includes dynamic subframes; response information fed back by a terminal in the physical uplink channel is received, and response information corresponding to the subframes in the subframe set is detected, so as to map response information corresponding to the dynamic subframes to uplink subframe n for a transmission; as a result, the timing relationship for transmitting the response information does not vary with the dynamic subframes, thereby avoiding an erroneous response information transmission caused when a signaling indicating whether the dynamic subframes are uplink subframes or downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe. Meanwhile, in the embodiment of the present invention, even if the dynamic subframes are uplink subframes, the number of bits of the feedback response information is still calculated as M, so that the number of modulation symbols occupied by the response information in the PUSCH does not vary with the dynamic subframes. Thus, even if the base station and the UE are inconsistent with each other in understanding whether the dynamic subframes are uplink subframes or downlink subframes, the data in the PUSCH and the response information corresponding to other subframes still can be ensured to be correctly received.

The embodiment provides a method for transmitting control information in a PUCCH, including:

401: a UE determines a subframe set corresponding to uplink subframe n, the subframe set including dynamic subframes.

For the implementation of the step, please refer to step 301, and herein is omitted.

In this step, even if the dynamic subframes are uplink subframes, they are still sorted into the subframe set corresponding to uplink subframe n. Thus, even if the base station and the UE are inconsistent with each other in understanding whether the dynamic subframes are uplink subframes or downlink subframes, the response information of other subframes still can be ensured to be correctly received.

402: the UE determines feedback response information according to the subframe set acquired in step 401.

This step may include the following three steps:

Step 402-a: determining the response information corresponding to respective subframes in the subframe set.

Specifically, in a case where the response information is spatially bundled, if a dynamic subframe in the subframe set is an uplink subframe, the response information corresponding to the dynamic subframe is discontinuous transmission DTX or negative-acknowledge response information NACK, herein is preferably discontinuous transmission DTX; and if the dynamic subframe is a downlink subframe, the response information corresponding to the dynamic subframe is dependent on the detection condition of the subframe downlink information. If neither a PDSCH transmission nor a PDCCH indicating a downlink SPS release is detected in the dynamic subframe, the response information corresponding to the dynamic subframe is discontinuous transmission DTX or negative-acknowledge response information NACK. If a PDSCH transmission is detected in the dynamic subframe, but at least one TB in data transmitted in the PDSCH is not correctly transmitted, the response information corresponding to the dynamic subframe is negative-acknowledge response information NACK. If a PDSCH transmission is detected in the dynamic subframe and data is correctly transmitted in the PDSCH, or a PDCCH indicating a downlink SPS release is detected in the dynamic subframe, the response information corresponding to the dynamic subframe is acknowledge response information ACK. For a downlink subframe in the subframe set, its corresponding response information is similar to the case where the dynamic subframe is a downlink subframe, and herein is omitted.

In this step, in a case where the response information is not spatially bundled, and the transmission mode corresponding to the carrier allows receiving a TB of two codewords, if a dynamic subframe in the subframe set is an uplink subframe, the response information corresponding to the dynamic subframe is discontinuous transmission DTX DTX or negative-acknowledge response information NACK NACK, herein is preferably discontinuous transmission DTX DTX; and if the dynamic subframe is a downlink subframe, the response information corresponding to the dynamic subframe is dependent on the detection condition of the subframe downlink information. If neither a PDSCH transmission nor a PDCCH indicating a downlink SPS release is detected in the dynamic subframe, the response information corresponding to the dynamic subframe is discontinuous transmission DTX DTX or negative-acknowledge response information NACK NACK. If a PDSCH transmission is detected in the dynamic subframe, but at least one TB in data transmitted in the PDSCH is not correctly transmitted, the response information corresponding to the dynamic subframe is negative-acknowledge response information NACK NACK. If a PDSCH transmission is detected in the dynamic subframe and data is correctly transmitted in the PDSCH, or a PDCCH indicating a downlink SPS release is detected in the dynamic subframe, the response information corresponding to the dynamic subframe is acknowledge response information ACK ACK. For a downlink subframe in the subframe set, its corresponding response information is similar to the case where the dynamic subframe is a downlink subframe, and herein is omitted.

In this step, even if the dynamic subframes are uplink subframes, the discontinuous transmission DTX is still taken as corresponding response information when determining the response information corresponding to respective subframes in the subframe set. Thus, even if the base station and the UE are inconsistent with each other in understanding whether the dynamic subframes are uplink subframes or downlink subframes, the response information of other subframes still can be ensured to be correctly received.

Step 402-b: sorting the response information corresponding to respective subframes, to acquire the feedback response information.

In this step, the response information corresponding to respective subframes may be sorted in a predetermined order, which may be a subframe sorting order in the subframe set, i.e., the response information corresponding to respective subframes may be sorted according to the subframe sorting order in the subframe set, so as to acquire the feedback response information. For example, response information corresponding to subframe $n-k_0$ in the subframe set K':$\{n-k_0, n-k_1, \ldots, n-k_{M-1}\}$ is firstly sorted, response information corresponding to subframe $n-k_1$ in the subframe set is secondly sorted, and so on, until response information corresponding to subframe $n-k_{M-1}$ in the subframe set is finally sorted. For example, in step 402-a, when the response information corresponding to respective subframes in the subframe set is determined by spatially bundling the response information, the feedback response information acquired according to the subframe set K':$\{n-k_0, n-k_1, \ldots, n-k_{M-1}\}$ may be represented as HARQ-ACK(0), HARQ-ACK(1), ..., HARQ-ACK(M−1), in which HARQ-ACK(0) is the response information corresponding to subframe $n-k_0$, HARQ-ACK(1) is the response information corresponding to subframe $n-k_1$, and so on, and HARQ-ACK(0) is the response information corresponding to subframe $n-k_{M-1}$.

403: the UE sends, in uplink subframe n, the feedback response information acquired in step 402 to the base station through a PUCCH.

This step further includes:

Step 403-a: determining, according to the feedback response information acquired in step 402, bits of the feedback response information and a PUCCH for feeding back the bits of the response information.

Figure 6:
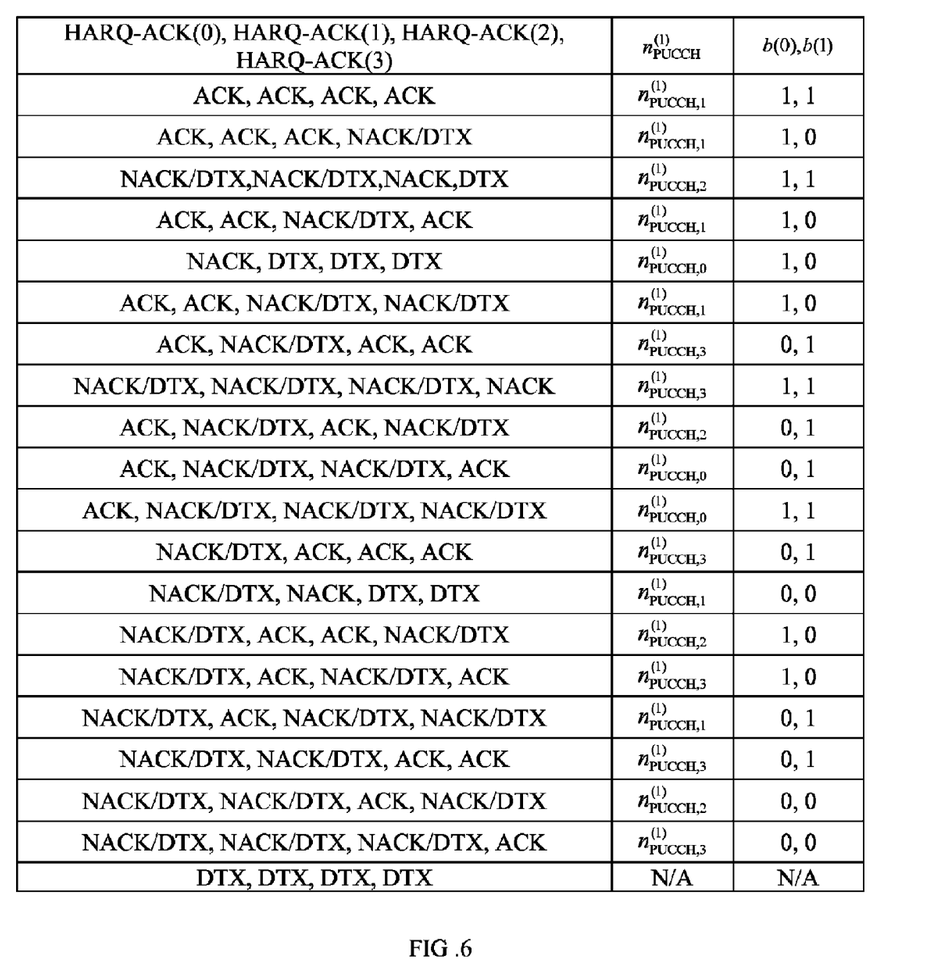
FIG. 6 is a response information bit mapping table used in an embodiment of the present invention.

For example, assuming that a set K:$\{n-k_0, n-k_1, \ldots, n-k_{M-1}\}$ in the embodiment is $\{7, 6, 8, 4\}$, uplink subframe n is subframe 2 or 7 in each of N radio frames, in which the format of the radio frame is illustrated in FIG. 2, the set K:$\{k_0, k_1, \ldots, k_{M-1}\}$ corresponding to uplink subframe 2 or 7 in each of the radio frames is $\{7, 6, 8, 4\}$, and the response information bit mapping table is illustrated in FIG. 6. In that case, the feedback response information corresponding to a subframe set K':$\{n-k_0, n-k_1, \ldots, n-k_{M-1}\}$ in step 402 may be represented as HARQ-ACK(0), HARQ-ACK(1), HARQ-ACK(2) and HARQ-ACK(3). The response information bit mapping table as illustrated in FIG. 6 is searched according to the acquired feedback response information, so as to find bits b (0) and b (1) of the feedback response information, and a PUCCH channel of the PUCCH for feeding back the bits of the response information. For example, if the response information HARQ-ACK(0), HARQ-ACK(1), HARQ-ACK(2), HARQ-ACK(3) corresponding to the subframe set K':$\{n-k_0, n-k_1, \ldots, n-k_{M-1}\}$ is ACK, ACK, ACK, ACK, respectively, as can be seen by searching the response information bit mapping table, the PUCCH channel for feedback is $n_{PUCCH,1}^{(1)}$ and the bits b (0) and b (1) of the feedback response information are 1, 1.

In this step, $n_{PUCCH,i}^{(1)}$ represents a PUCCH selected from the response information resources reserved for subframe $n-k_i$ by the base station, according to PDCCH scheduling condition in) subframe $n-k_i$ in the subframe set. Specifically, $n_{PUCCH,i}^{(1)} = (M-i-1) \times N_P + i \times N_{P+1} + n_{CCE,i} + N_{PUCCH}^{(1)}$, in which P is selected from the set $\{0, 1, 2, 3\}$, so that $N_P \leq N_{CCE,i} < N_{P+1}$, $N_p = \max\{0, \lfloor [N_{RB}^{DL} \times (N_{sc}^{RB} \times p - 4)]/36 \rfloor\}$, $n_{CCE,i}$ is the serial number of a first Control Channel Element (CCE) for PDCCH transmission in subframe $n-k_i$, and $N_{PUCCH}^{(1)}$ is a parameter notified by a high level signaling.

In the embodiment of the present invention, when the response information is to be transmitted in uplink subframe n and in the PUSCH, the base station may the reserve response information resources according to the subframe set acquired in step 401, i.e., reserve a PUCCH for response information transmission. The subframe set in step 401 may be determined according to the set K:$\{n-k_0, n-k_1, \ldots, n-k_{M-1}\}$, thus it may be deemed that the base station shall reserve the response information resources according to the set K:$\{k_0, k_1, \ldots, k_{M-1}\}$, specifically: the base station reserves response information resources in uplink subframe n for each subframe in the subframe set K':$\{n-k_0, n-k_1, \ldots, n-k_{M-1}\}$, i.e., reserves PUCCHs for response information transmission for each subframe; and sorts the reserved response information resources in the order of subframes in the subframe set K':$\{n-k_0, n-k_1, \ldots, n-k_{M-1}\}$, so as to obtain the response information resources reserved in uplink subframe n by the base station according to the subframe set acquired in step 401. When the set K:$\{k_0, k_1, \ldots, k_{M-1}\}$ is $\{7, 6, 8, 4\}$ or $\{7, 6, 4, 8\}$, as can be seen from the description of step 401, subframes n−8 and n−4 in the set K':$\{n-k_0, n-k_1, \ldots, n-k_{M-1}\}$ are dynamic subframes. When the dynamic subframes are used as uplink subframes, the response information resources reserved for them by the base station are not used, and hence may be arranged at the last of the reserved resources for other purposes, so as to reduce the resource wastes.

In this step, even if the dynamic subframes are uplink subframes, the bits of the feedback response information and the PUCCH for feeding back the bits of the response information are still determined according to the response information bit mapping table. Thus, even if the base station and the UE are inconsistent with each other in understanding whether the dynamic subframes are uplink subframes or downlink subframes, the response information corresponding to other subframes still can be ensured to be correctly received.

Step 403-b: sending, in uplink subframe n, bits of the feedback response information acquired in step 403-a to the base station through the PUCCH for feeding back the bits of the response information acquired in step 403-*a*.

404: the base station detects the response information sent by the user.

This step may include the following two steps:

Step 404-1: the base station determines a subframe set corresponding to uplink subframe n, the subframe set including dynamic subframes.

For the implementation of the step, please refer to step 401, and herein is omitted.

Step 404-2: the base station receives, in uplink subframe n, response information fed back by a terminal in a physical uplink channel, and detects response information sent by the UE and corresponding to the subframes in the subframe set acquired in step 404-1.

The base station receives the response information back by the terminal in the physical uplink channel, and detects, in uplink subframe n and the response information resources reserved by the base station, the response information corresponding to the subframes in the subframe set acquired in step 404-1. For the detailed description of the response information resources reserved by the base station, please refer to step 403-*a*, and herein is omitted. Specifically, the step may include the following steps:

Step 404-2-*a*: the base station determine PUCCHs possibly transmitting the response information.

The base station determines, according to the scheduling condition, the subframes in the subframe set acquired in step 404-1, corresponding to which the PUCCHs possibly transmit the response information sent by the UE, i.e., if the base station schedules PDSCH data or sends a PDCCH signaling indicating a downlink SPS release in subframe $n-k_i$ in the subframe set acquired in step 404-1, it is determined that the response information is possibly transmitted in $n_{PUCCH,i}^{(1)}$ corresponding to subframe $n-k_i$.

Step 404-2-*b*: the base station performs a blind detection of one or more PUCCHs acquired in step 404-2-*a*, so as to acquire a PUCCH for response information transmission and the bits b (0) and b (1) of the response information transmitted in the channel.

Step 404-2-*c*: the base station inquires the response information bit mapping table as illustrated in FIG. 6 according to the bits b (0) and b (1) of the response information detected in step 404-2-*b*, so as to obtain response information corresponding to the subframes in the subframe set acquired in step 404-1.

In the method for transmitting control information provided by the embodiment of the present invention, a subframe set corresponding to uplink subframe n is determined through a UE, in which the subframe set includes dynamic subframes; feedback response information is determined according to the subframe set, and sent in uplink subframe n to a base station through a physical uplink channel. The subframe set corresponding to uplink subframe n is determined through the base station, in which the subframe set includes dynamic subframes; response information fed back by a terminal in the physical uplink channel is received, and response information corresponding to the subframes in the subframe set is detected, so as to map response information corresponding to the dynamic subframes to uplink subframe n for a transmission; as a result, the timing relationship for transmitting the response information does not vary with the dynamic subframes, thereby avoiding an erroneous response information transmission caused when a signaling indicating whether the dynamic subframes are uplink subframes or downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe. Meanwhile, in the embodiment of the present invention, even if the dynamic subframes are uplink subframes, the discontinuous transmission DTX is still taken as corresponding response information when determining the response information corresponding to respective subframes in the subframe set, and the bits of the feedback response information and the PUCCH for feeding back the bits of the response information are still determined according to the response information bit mapping table. Thus, even if the base station and the UE are inconsistent with each other in understanding whether the dynamic subframes are uplink subframes or downlink subframes, the response information corresponding to other subframes still can be ensured to be correctly received.

All the embodiments of the present invention are applicable to not only the control information transmission in the application scenario of the dynamic TDD subframe, but also the control information transmission in the application scenario of the FDD/TDD flexible spectrum, in which the application scenario of the FDD/TDD flexible spectrum refers to using the uplink resources of the system for downlink transmission in certain subframes.

Figure 7:
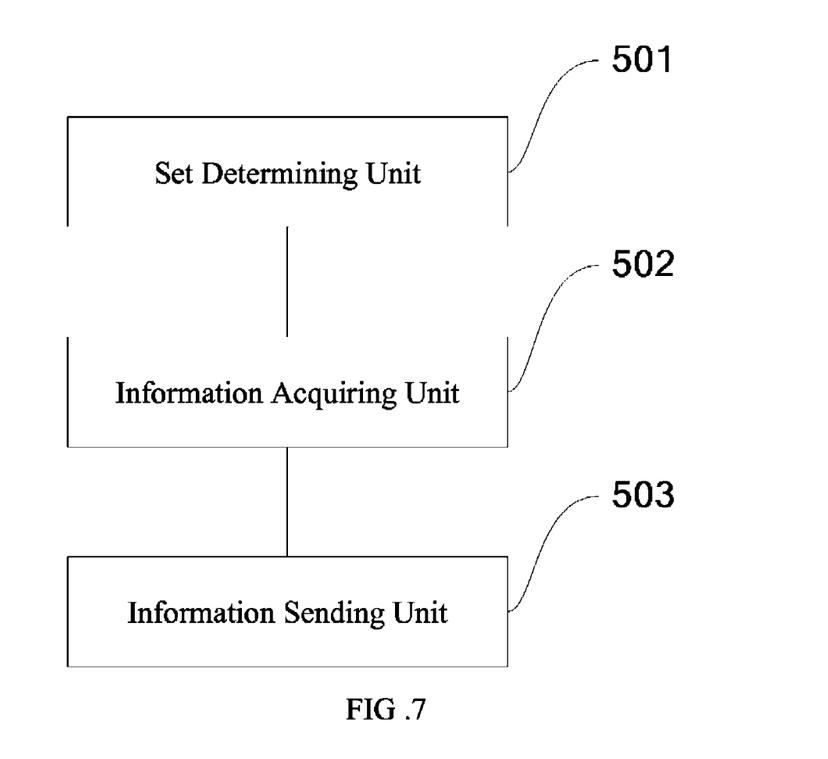
FIG. 7 is a constitution diagram of a UE provided by an embodiment of the present invention.

In correspondence to the above method, the embodiments of the present invention further provide a UE, as illustrated in FIG. 7, including:

a set determining unit 501 configured to determine a subframe set corresponding to uplink subframe n, the subframe set including dynamic subframes;

an information acquiring unit 502 configured to determine feedback response information according to the subframe set determined by the set determining unit;

an information sending unit 503 configured to send, in uplink subframe n, the feedback response information to a base station through a physical uplink channel, in which n is the subframe serial number of the uplink subframe, and n is a natural number larger than or equal to 0.

Further, the set determining unit 501 may be configured to determine a subframe set $K':\{n-k_0, n-k_1, \ldots, n-k_{M-1}\}$ corresponding to uplink subframe n according to a timing relationship preset for feeding back the response information, in which $k_0, k_1, \ldots, k_{M-1}$ are positive integers, and the subframe set includes dynamic subframes and fixed downlink subframes. Specifically, the subframe set $K':\{n-k_0, n-k_1, \ldots, n-k_{M-1}\}$ corresponding to uplink subframe n may be determined according to a set $K:\{n-k_0, n-k_1, \ldots, n-k_{M-1}\}$, in which the subframe set $K':\{n-k_0, n-k_1, \ldots, n-k_{M-1}\}$ includes dynamic subframes and fixed downlink subframes, the set $K:\{k_0, k_1, \ldots, k_{M-1}\}$ is corresponding to uplink subframe n, and $k_0, k_1, \ldots, k_{M-1}$ are positive integers. The set $K:\{k_0, k_1, \ldots, k_{M-1}\}$ may be $\{7, 6, 8, 4\}$ or $\{7, 6, 4, 8\}$.

Further, the information acquiring unit 502 includes:

a subframe information acquiring subunit configured to determine the response information corresponding to respective subframes in the subframe set; and a feedback information acquiring subunit configured to sort the response information corresponding to respective subframes, to acquire the feedback response information.

Further, the information sending unit 503 includes:

a feedback bit number acquiring subunit configured to determine the number of bits of the feedback response information according to the set $K:\{k_0, k_1, \ldots, k_{M-1}\}$;

a modulation symbol number acquiring subunit configured to determine the number of modulation symbols occupied by the feedback response information in a PUSCH, according to the number of bits of the feedback response information;

a coded bit number acquiring subunit configured to determine the number of bits of the feedback response information having been channel-coded, according to the number of modulation symbols;

a coded information acquiring subunit configured to perform a channel coding of the feedback response information according to the number of bits of the feedback response information having been channel-coded, so as to acquire channel-coded response information; and a coded information sending subunit configured to send, in uplink subframe n, the channel-coded response information to the base station through the PUSCH.

For the specific working principle of the UE of the embodiment, please refer to the aforementioned method, which is omitted herein.

In the UE provided by the embodiment of the present invention, a subframe set corresponding to uplink subframe n is determined, in which the subframe set includes dynamic subframes; feedback response information is determined according to the subframe set, and sent in uplink subframe n to a base station through a physical uplink channel, so as to map response information corresponding to the dynamic subframes to uplink subframe n for a transmission; as a result, the timing relationship for feeding back the response information does not vary with the dynamic subframes, thereby avoiding an erroneous response information transmission caused when a signaling indicating whether the dynamic subframes are uplink subframes or a downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

Figure 8:
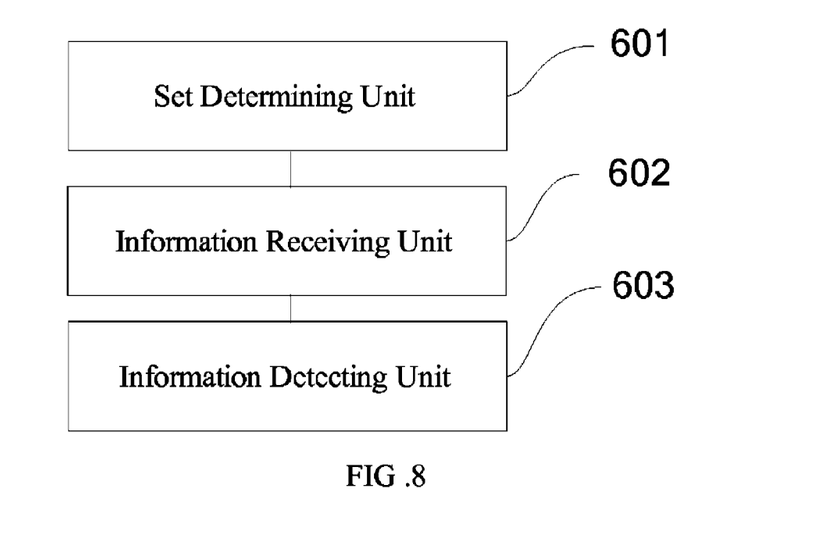
FIG. 8 is a constitution diagram of a base station provided by an embodiment of the present invention.

In correspondence to the above device, the embodiment provides a base station, as illustrated in FIG. 8, the base station including:

a set determining unit 601 configured to determine a subframe set corresponding to uplink subframe n, the subframe set including dynamic subframes, in which n is the subframe serial number of the uplink subframe, and n is a natural number larger than or equal to 0;

an information receiving unit 602 configured to receive response information fed back by a terminal in a physical uplink channel; and an information detecting unit 603 configured to detect response information corresponding to subframes in the subframe set determined by the set determining unit.

Further, the set determining unit 601 specifically may be configured to determine a subframe set K':{n−$k_0$, n−$k_1$, . . . , n−$k_{M-1}$} corresponding to uplink subframe n according to a set K:{$k_0$, $k_1$, . . . , $k_{M-1}$}, the subframe set K':{n−$k_0$, n−$k_1$, . . . , n−$k_{M-1}$} including the dynamic subframes, in which $k_0$, $k_1$, . . . , $k_{M-1}$ are positive integers.

Further, the information detecting unit 603 is specifically configured to detect, in the response information resources reserved by the base station, the response information sent by the UE and corresponding to subframes in the subframe set.

Further, the information detecting unit 603 includes:

an information bit number acquiring subunit configured to determine, in uplink subframe n, the number of bits of the response information fed back by the UE according to the subframe set;

a modulation symbol number acquiring subunit configured to determine the number of modulation symbols occupied by the feedback response information in a PUSCH, according to the number of bits of the feedback response information; and a feedback information acquiring subunit configured to detect the feedback response information transmitted in the PUSCH according to the number of modulation symbols.

For the specific working principle of the base station of the embodiment, please refer to the aforementioned method, which herein is omitted.

In the base station provided by the embodiment of the present invention, a subframe set corresponding to uplink subframe n is determined, in which the subframe set includes dynamic subframes; response information fed back by a terminal in a physical uplink channel is received, and response information corresponding to subframes in the subframe set is detected, so as to map response information corresponding to the dynamic subframes to uplink subframe n for a detection; as a result, the timing relationship for detecting the response information does not vary with the dynamic subframe, thereby avoiding an erroneous response information transmission caused when a signaling indicating whether the dynamic subframes are uplink subframes or downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

Figure 9:
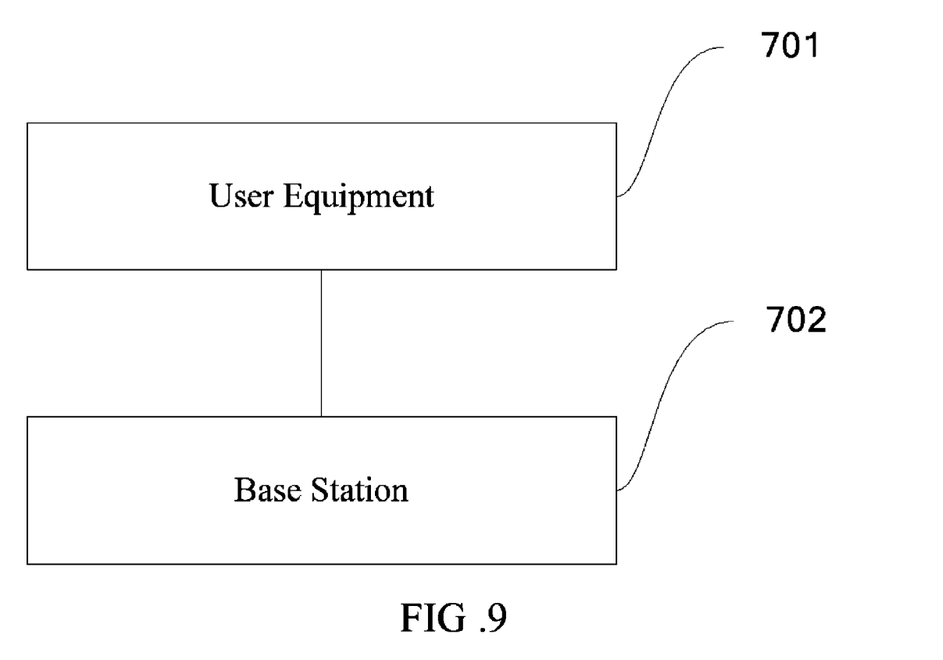
FIG. 9 is a constitution diagram of a system for transmitting control information provided by an embodiment of the present invention.

In correspondence to the above method and device, the embodiments of the present invention further provide a system for transmitting control information, as illustrated in FIG. 9, including:

a UE 701 configured to determine a subframe set corresponding to uplink subframe n, the subframe set including dynamic subframes; determine feedback response information according to the subframe set; and send, in uplink subframe n, the feedback response information to a base station 702 through a physical uplink channel, in which n is the subframe serial number of the uplink subframe, and n is a natural number larger than or equal to 0; and the base station 702 configured to determine a subframe set corresponding to uplink subframe n, the subframe set including dynamic subframes, in which n is the subframe serial number of the uplink subframe, and n is a natural number larger than or equal to 0; and receive response information fed back by a terminal in a physical uplink channel, and detect response information corresponding to subframes in the subframe set.

In the system for transmitting control information provided by the embodiment of the present invention, a subframe set corresponding to uplink subframe n is determined through a UE, in which the subframe set includes dynamic subframes; feedback response information is determined according to the subframe set, and sent in uplink subframe n to a base station through a physical uplink channel. The subframe set corresponding to uplink subframe n is determined through the base station, in which the subframe set includes dynamic subframes; response information fed back by a terminal in the physical uplink channel is received, and response information corresponding to the subframes in the subframe set is detected, so as to map response information corresponding to the dynamic subframes to uplink subframe n for a transmission; as a result, the timing relationship for transmitting the response information does not vary with the dynamic subframes, thereby avoiding an erroneous response information transmission caused when a signaling indicating whether the dynamic subframes are uplink subframes or downlink subframes is lost or falsely detected by the UE. Thus, the response information can be fed back in the application scenario of the dynamic TDD subframe, thereby reducing the possibility of data loss during a transmission in the application scenario of the dynamic TDD subframe, and ensuring the security of the data transmission in the application scenario of the dynamic TDD subframe.

A person skilled in the art shall appreciate that all or parts of flows in the above method embodiments may be implemented by instructing relevant hardware through a computer program which may be stored in a computer readable storage medium and may include the flows of the above method embodiments when being executed. In which, the storage medium may be magnetic disk, optical disk, Read-Only Memory (ROM), or Random Access Memory (RAM), etc.

The above descriptions are just preferred embodiments of the present invention, and the protection scope of the present invention is not limited thereto. Any change or substitution easily conceivable to a person skilled in the art within the technical scope disclosed by the present invention shall fall within the protection scope of the present invention. Therefore, the protection scope of the present invention shall be determined by the protection scope of the claims.

The invention claimed is:

1. A method for transmitting control information, comprising:
    determining a subframe set K':$\{n-k_0, n-k_1, \ldots, n-k_{M-1}\}$ corresponding to an uplink subframe n and comprising one or more dynamic subframes according to a set K:$\{k_0, k_1, \ldots, k_{M-1}\}$, wherein the one or more dynamic subframes comprise an uplink subframe, $k_0$, $k_1, \ldots k_{M-1}$ are positive integers;
    determining feedback response information according to the subframe set; and
    sending, in the uplink subframe n, the feedback response information to a base station through a physical uplink channel, wherein n is a subframe serial number of the uplink subframe and n is a natural number larger than or equal to 0,
    wherein the determining the feedback response information according to the subframe set comprises:
        determining response information corresponding to respective subframes in the subframe set; and
        sorting the response information corresponding to respective subframes to acquire the feedback response information,
        wherein the set K:$\{k_0, k_1, \ldots, k_{M-1}\}$ is $\{7, 6, 8, 4\}$ or $\{7, 6, 4, 8\}$.

2. The method according to claim 1, wherein the subframe set is $\{n-7, n-6, n-8, n-4\}$ or $\{n-7, n-6, n-8\}$, and subframes n-4 and n-8 are dynamic subframes.

3. The method according to claim 1, wherein the uplink subframe n is a third subframe or an eighth subframe in each radio frame of N radio frames, wherein N is an integer larger than or equal to 1.

4. A method for transmitting control information, comprising:
    determining a subframe set K':$\{n-k_0, n-k_1, \ldots, n-k_{M-1}\}$ corresponding to uplink subframe n and comprising one or more dynamic subframes according to a set K:$\{k_0, k_1, \ldots, k_{M-1}\}$, wherein the one or more dynamic subframes comprise an uplink subframe, $k_0$, $k_1, \ldots k_{M-1}$ are positive integers, n is a subframe serial number of the uplink subframe and n is a natural number larger than or equal to 0; and
    receiving response information fed back by a User Equipment (UE) in a physical uplink channel, and detecting response information corresponding to subframes in the subframe set,
    wherein the response information fed back by the UE is acquired by sorting determined response information corresponding to respective subframes,
    wherein the set K:$\{k_0, k_1, \ldots, k_{M-1}\}$ is $\{7, 6, 8, 4\}$ or $\{7, 6, 4, 8\}$.

5. The method according to claim 4, wherein the subframe set is $\{n-7, n-6, n-8, n-4\}$ or $\{n-7, n-6, n-4, n-8\}$, and subframes n-4 and n-8 are dynamic subframes.

6. The method according claim 4, wherein the uplink subframe n is a third subframe or an eighth subframe in each radio frame of N radio frames, wherein N is an integer larger than or equal to 1.

7. A User Equipment (UE), comprising:
    a processor and a memory having program instructions stored therein, wherein when the instructions are executed by the processor configure the processor to:
    determine a subframe set K':$\{n-k_0, n-k_1, \ldots, n-k_{M-1}\}$ corresponding to an uplink subframe n and comprising one or more dynamic subframes according to a set K:$\{k_0, k_1, \ldots, k_{M-1}\}$, wherein the one or more dynamic subframes comprise an uplink subframe, $k_0$, $k_1, \ldots k_{M-1}$ are positive integers and determine response information corresponding to respective subframes in the subframe set, and sort the response information corresponding to respective subframes to acquire the feedback response information; and
    a transmitter, configured to send, in the uplink subframe n, the feedback response information to a base station through a physical uplink channel, wherein n is a subframe serial number of the uplink subframe, and n is a natural number larger than or equal to 0,
    wherein the set K:$\{k_0, k_1, \ldots, k_{M-1}\}$ is $\{7, 6, 8, 4\}$ or $\{7, 6, 4, 8\}$.

8. The UE according to claim 7, wherein the subframe set is $\{n-7, n-6, n-8, n-4\}$ or $\{n-7, n-6, n-4, n-8\}$, and subframes n-4 and n-8 are dynamic subframes.

9. The UE according to claim 7, wherein the uplink subframe n is a third subframe or an eighth subframe in each of N wireless frames, wherein N is an integer larger than or equal to 1.

10. A base station, comprising:
    a processor, configured to determine a subframe set K':$\{n-k_0, n-k_1, \ldots, n-k_{M-1}\}$ corresponding to an uplink subframe n and comprising one or more dynamic subframes according to a set K:$\{k_0, k_1, \ldots, k_{M-1}\}$, wherein the one or more dynamic subframes comprise an uplink subframe, $k_0$, $k_1, \ldots k_{M-1}$ are positive integers, n is a subframe serial number of the uplink subframe, and n is a natural number larger than or equal to 0; and
    a receiver, configured to receive response information fed back by a User Equipment (UE) in a physical uplink channel;

wherein the processor is further configured to detect response information corresponding to subframes in the determined subframe set;

wherein the response information fed back by the UE is acquired by sorting determined response information corresponding to respective subframes, wherein the set K:$\{k_0, k_1, \ldots, k_{M-1}\}$ is $\{7, 6, 8, 4\}$ or $\{7, 6, 4, 8\}$.

11. The base station according to claim 10, wherein the subframe set is $\{n-7, n-6, n-8, n-4\}$ or $\{n-7, n-6, n-4, n-8\}$, and subframes are dynamic subframes.

12. The base station according to claim 10, wherein the uplink subframe n is a third subframe or an eighth subframe in each of N wireless frames, wherein N is an integer larger than or equal to 1.

13. A system for transmitting control information, comprising a User Equipment (UE) and base station;

the UE comprises:
a UE processor, configured to: determine a subframe set K':$\{n-k_0, n-k_1, \ldots, n-k_{M-1}\}$ corresponding to an uplink subframe n and comprising one or more dynamic subframes according to a set K:$\{k_0, k_1, \ldots, k_{M-1}\}$, and determine response information corresponding to respective subframes in the subframe set, and sort the response information corresponding to respective subframes to acquire the feedback response information;

a transmitter, configured to send, in the uplink subframe n, the feedback response information to a base station through a physical uplink channel; and the base station comprises:
a base station processor, configured to determine a subframe set K':$\{n-k_0, n-k_1, \ldots, n-k_{M-1}\}$ corresponding to the uplink subframe n and comprising one or more dynamic subframes according to a set K:$\{k_0, k_1, \ldots, k_{M-1}\}$, a receiver, configured to receive response information fed back by a UE in a physical uplink channel, and wherein the base station processor is further configured to detect response information corresponding to subframes in the determined subframe set;

wherein the one or more dynamic subframes comprise an uplink subframe, $k_0, k_1, \ldots k_{M-1}$ are positive integers, n is a subframe serial number of the uplink subframe, and n is a natural number larger than or equal to 0, wherein the set K:$\{k_0, k_1, \ldots, k_{M-1}\}$ is $\{7, 6, 8, 4\}$ or $\{7, 6, 4, 8\}$.

* * * * *